United States Patent [19]

Ingram et al.

[11] Patent Number: 5,050,473
[45] Date of Patent: Sep. 24, 1991

[54] MITER APPARATUS

[76] Inventors: Janice Ingram; Keith W. Ingram, both of 2158 Pelwood Dr., Centerville, Ohio 45459

[21] Appl. No.: 351,701

[22] Filed: May 12, 1989

[51] Int. Cl.⁵ .......................................... B27B 11/04
[52] U.S. Cl. .............................. 83/454; 83/468.003; 83/468.004; 83/574; 83/581
[58] Field of Search ................. 83/574, 451, 581, 467, 83/452, 453, 454, 455, 483, 468.1, 468.2, 468.3, 468.4, 468.7; 269/305, 303, 69, 81

[56] References Cited

U.S. PATENT DOCUMENTS

| | | | |
|---|---|---|---|
| 2,285,897 | 6/1942 | Campbell | 29/69 |
| 2,366,385 | 8/1943 | Comfort | 269/69 X |
| 2,547,211 | 4/1951 | Holmes | 269/305 |
| 2,651,333 | 9/1953 | Spinney | 143/6 |
| 2,677,399 | 5/1954 | Getsinger | 143/6 |
| 2,735,456 | 2/1956 | Grier et al. | 143/6 |
| 2,803,271 | 8/1957 | Shaw | 143/6 |
| 2,876,808 | 3/1959 | Linkheim | 143/6 |
| 3,410,324 | 11/1968 | Thompson | 83/581 X |
| 3,570,562 | 3/1971 | Tracy | 143/6 |
| 3,608,886 | 9/1971 | Greene | 269/305 |
| 3,695,318 | 10/1972 | Maury | 144/35 |
| 3,842,700 | 10/1974 | Novak | 83/743 |
| 3,865,360 | 2/1975 | Schweidler | 269/81 |
| 4,157,819 | 6/1979 | Meyer | 269/303 X |
| 4,320,678 | 3/1982 | Volk | 83/581 |
| 4,328,728 | 5/1982 | Ferdinand et al. | 83/574 X |
| 4,353,399 | 10/1982 | Harris | 144/2 |

OTHER PUBLICATIONS

True-Cut Taper Jig Moon's Saw Shop Supplies article entitled "Dubby".

Primary Examiner—Frank T. Yost
Assistant Examiner—Kenneth E. Peterson
Attorney, Agent, or Firm—Jeffers, Hoffman & Niewyk

[57] ABSTRACT

A mitering apparatus for use with a portable electric saw. The apparatus includes a base with surfaces which are parallel to but spaced from each other. One of the surfaces supports a saw guide for supporting and guiding an electrically powered hand saw. A second surface supports a workpiece and a third surface protects the saw blade. The workpiece supporting surface includes a plurality of apertures and slots. A first frusto-conical workpiece retaining member may be inserted in selected one of the apertures. A second frusto-conical workpiece retaining member is adjustably retained in a selected one of the slots. A third frusto-conical workpiece retaining member is secured in a fixed position on the workpiece supporting surface. The retaining stops can be adjusted to maintain a workpiece in a selected orientation on the workpiece supporting surface so that the saw will cut the workpiece at a selected angle. The base may also be rotated and then retained in the selected orientation for handling long workpieces.

20 Claims, 2 Drawing Sheets

MITER APPARATUS

BACKGROUND OF THE INVENTION

This invention relates to a miter apparatus, and more particularly to a miter apparatus for use with a hand held power saw.

In the use of hand held power saws it is frequently necessary to cut pieces of lumber at a desired angle with assurance that the angle of the cut will be the same for each workpiece. For instance, in forming square joints for door frames and the like, it is necessary to cut the long pieces of wood with 45° angles so that the finished door joint will be exactly 90° with an accurate fit of the pieces of wood which makes up the joint.

A number of prior art mitering devices have been provided for use with manual saws or electrically powered table saws. Furthermore, a number of prior art mitering devices have been provided for hand held power saws. A problem with these prior art devices has been that they are relatively complicated and expensive to manufacture. Additionally, they have been quite cumbersome to use and difficult to adjust. Furthermore, they have been insufficiently adjustable in order to provide a wide range of miters to be cut. Some of these prior art devices have also provided rather inaccurately cut miters because the workpiece could move in the apparatus during cutting. Lastly, many of these devices have been difficult to use with long workpieces and have not provided sufficient adjustability so that long workpieces could be handled.

It is therefore desired to provide a simple and inexpensive portable mitering apparatus for use with hand held power saws. It is also desired to provide such a mitering apparatus which is easy to use and easy to adjust in order to provide accurately cut miters. Lastly, it is desired to provide such a mitering apparatus wherein long workpieces can be handled.

SUMMARY OF THE INVENTION

The present invention overcomes the disadvantages of the above described prior art mitering devices by providing an improved miter apparatus therefor.

The apparatus according to the present invention includes a base in the first surface for supporting a workpiece. The base also includes a second surface for supporting a saw guide. The second surface is parallel to the first surface and is spaced thereabove. The entire base may be pivotably mounted to accommodate long workpieces. The base includes a number of posts or retaining members for supporting a workpiece on the first surface. One of the posts is adjustable to accommodate workpieces of greater or smaller widths. Another of the posts may be moved to different locations on the base whereby the workpiece may be oriented at various angles for cutting of various miters.

The present invention, in one form thereof, comprises a base with a first surface for supporting a workpiece and a second raised surface for supporting a saw guide. The second surface is segmented to form two surface areas with a space located therebetween whereby a workpiece can be accommodated in the space and whereby the saw guide bridges the space. A first fixed retaining post is secured to the first surface. The first surface also includes several apertures, one of which may be selected to receive another post so that a workpiece may be retained on the first surface in various orientations. A further adjustable post is adjustably received in a slot in the first surface for retaining the workpiece in intimate contact with the first and second posts. The retaining posts are frustoconically shaped whereby the workpiece is retained in intimate contact with the first work surface.

The present invention is advantageous in that it is very simple to manufacture, easy to adjust, and easy to use.

Another advantage of the present invention is that the entire base may be pivoted or rotated to handle long workpieces.

A further advantage of the present invention is that, in most cases, no direct clamping of the workpiece is needed because the posts will retain the workpiece against the first work surface and between the tapered faces of the posts.

A further advantage of the present invention is that the blade of the saw is protected by a third surface which forms part of the base.

The present invention, in one form thereof, comprises a miter apparatus for use with a portable electric saw comprising a base including a first surface, a second surface oriented parallel to the first surface and an adapter for supporting a saw. The base further includes a third surface oriented parallel to and intermediate the first and second surfaces for supporting a workpiece. A saw guide is secured to the third surface for laterally guiding the saw. A workpiece retaining means is provided for retaining the workpiece in a selected orientation on the third surface. The workpiece retaining means includes a first guide member secured to the third surface, a second guide member removably secured to the third surface and a third guide member adjustably secured to the third surface, whereby a work piece may be retained on the base in a selected orientation for cutting by a saw.

The miter apparatus according to the present invention, in one form thereof, comprises a generally planar base having first, second, and third surfaces which are oriented generally parallel to each other. The first surface is adapted to support a saw, the second surface is adapted to provide protection for a saw blade and the third surface is adapted to support a workpiece. The first surface is formed by two surface areas with a space located therebetween. A saw guide is supported by the first surface and bridges the space whereby a workpiece may be inserted into the space. A first workpiece retaining member is secured to the third surface, a second workpiece retaining member is removably secured to the third surface, and a third adjustable workpiece retaining member is adjustably secured to the third surface whereby a workpiece may be retained on the base in a selected orientation for cutting by a saw.

The present invention, in one form thereof, comprises a miter apparatus for use with a portable electric saw comprising a generally planar base including a first surface, a second surface oriented parallel to the first surface and adapted to support a saw. A third surface positioned parallel to and intermediate the first and second surfaces is adapted to support a workpiece. The second surface is formed by two surface areas with a space located therebetween. A saw guide is supported by a first surface and bridges the space whereby a workpiece may be inserted into the space. A first workpiece retaining stop member is secured to the third surface. A plurality of apertures is provided in the third surface. The second workpiece retaining stop member is removably retained in a selected one of the plurality of apertures. An adjustable workpiece retaining stop member is adjustably secured to the third surface, whereby a workpiece may be retained on the base in a selected orientation for cutting by a saw.

It is therefore an object of the present invention to provide a simple, easy to use and easy to adjust, miter apparatus which can accommodate long workpieces and wherein the workpiece need not be clamped.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
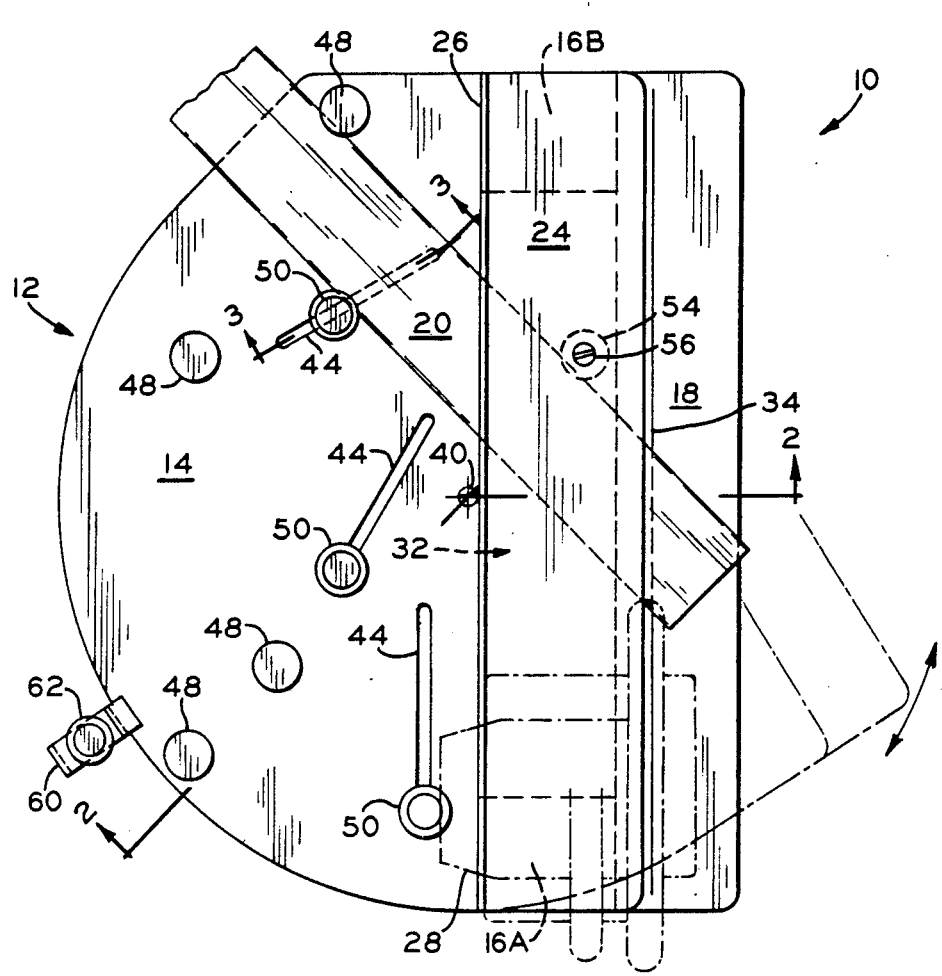
FIG. 1 is a top plan view of the miter apparatus according to the present invention.
Figure 2:
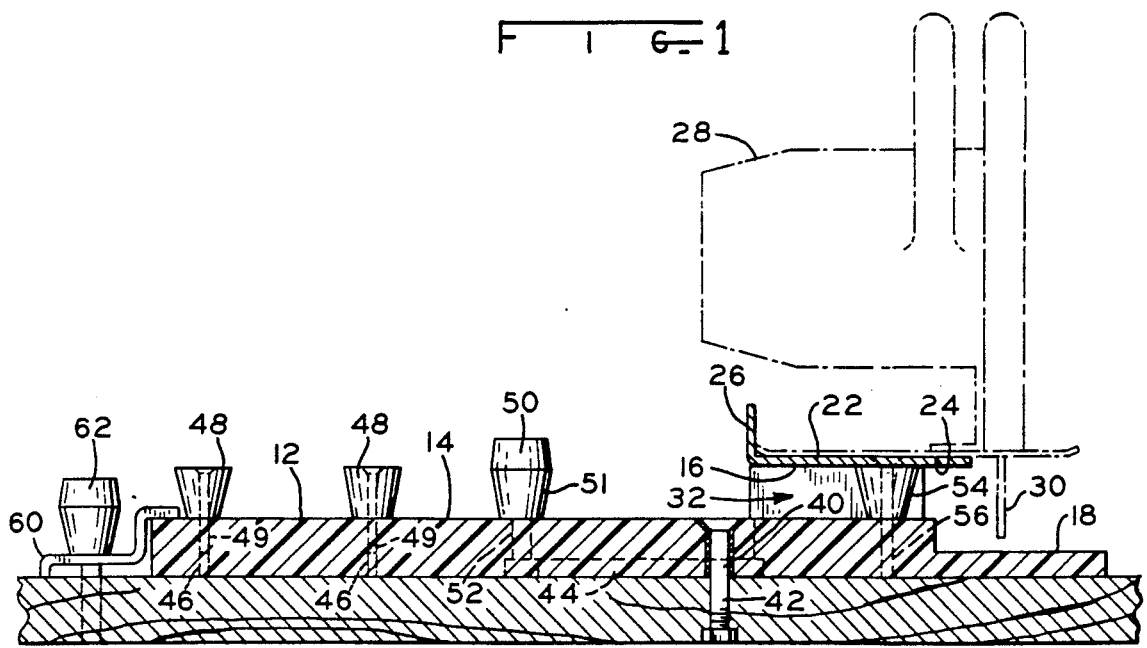
FIG. 2 is a cross sectional view of the apparatus of FIG. 1 taken along line 2—2 thereof.
Figure 3:
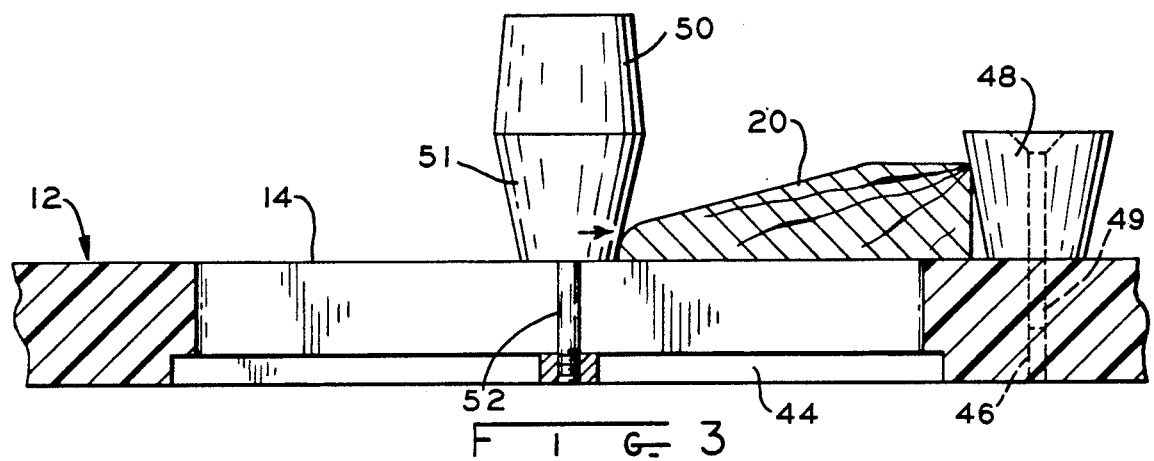
FIG. 3 is an enlarged, partial, cross sectional view taken along line 3—3 of FIG. 1.

Referring to FIGS. 1-3, the miter apparatus 10 includes a base 12 which has three surfaces located parallel to each other. Surface 14 is a work supporting surface for supporting a work piece 20. Surface 16 is a saw guide supporting surface for supporting a saw guide 22. The saw guide supporting surface 16 comprises two sections 16a and 16b. The saw guide 22 bridges surface sections 16a and 16b, thus forming a space 32 between saw guide 22, workpiece support surface 14, and saw guide support surfaces 16a and 16b. The workpiece 20, as best seen in FIG. 1, extends through the space in a selected orientation so that it can be cut by a hand operated power saw. A further surface 18 provides protection for the saw blade so that saw blade 30 of saw 28, as it cuts workpiece 20, will not be damaged. Thus in effect, workpiece surface 14 is located intermediate protective surface 18 and saw guide surface 16.

Saw guide 22 includes a saw supporting surface 24 and a lateral guide surface 26, whereby the hand held power saw 28 may slide on surface 24, guided by lateral guide surface 26 for cutting workpiece 20. Surface 18 also includes a mark 34 for indicating the cutting line of saw blade 30. Thus, workpiece 20 may be axially adjusted to provide the proper length of workpiece 20, after cutting.

Base 12 may be fastened to an underlying surface by means of a fastener 42 which is disposed in an aperture 40 in base 12. By virtue of this arrangement, base 12 may be rotated to accommodate long workpieces. A workpiece 20 is retained in a selected orientation by the use of several stops. A fixed stop or workpiece guide 54 is provided which is secured to base 12 by means of fastener 56. Stop 54 forms a pivoting point for workpiece 20. A second stop or workpiece guide 48 is removably secured to the work support surface 14 of base 12. A plurality of apertures 46 are provided in surface 14 into which stop 48 may be selectively inserted. Thus, stop 48 can be inserted into any selected aperture 46. Removable stop 48 includes a peg 49 which can be inserted in apertures 46. By referring to FIG. 1, it can be seen that a number of such stops 48 have been inserted into surface 14. Since the stops 48 are removable, a workpiece can be oriented in any selected one of several apertures 46. Preferably the apertures 46 are located so that a workpiece 20 may be oriented to give preselected miter angles such as 45°, 90°, and 60°. It should be understood that miter apparatus 10 could be provided with a plurality of stops 48 permanently secured to surface 14. Thus the apparatus could be used for mitering without adjustment of stops 48.

A third stop workpiece guide 50 is also provided. A plurality of such stops 50 are shown in FIG. 1. These stops 50 are adjustable in slots 44. As best seen in FIG. 2, fasteners 52 retain adjustable stops 50 in preselected orientations in slots 44. The stops are adjusted, prior to securement by fasteners 52, to urge the workpiece 20 into contact with a removable stop 48 and fixed stop 54. Thus workpieces of various widths can be accommodated in the apparatus.

It should also be noted, by reference to FIG. 2, that fixed stop 54, removable stops 48, and adjustable stops 50 all include frusto-conical surfaces. These frusto-conical surfaces assure that a workpiece is clamped or retained in intimate contact with workpiece supporting surface 14, as best seen in FIG. 3.

It should be noted that if very thin workpieces are to be cut, a clamping device, such as a simple wedge, could be used to clamp a workpiece to work surface 14. The wedge could be inserted between the workpiece and the saw guide to clamp the workpiece to the work surface. Furthermore, the stops or workpiece guides 48 could be formed with trapezoidal downwardly tapering surfaces to present flat tapered surfaces to a workpiece. Fixed stop 50 could have a faceted tapered surface rather than a frustoconical surface to accommodate workpieces oriented at various angles thereto. Similarly adjustable stop 50 could be faceted and tapered, rather than frustoconical.

A bracket 60, including a fastener 62, is used to secure base 12 in a selected orientation after pivoting of the base around fastener 42.

Figure 4:
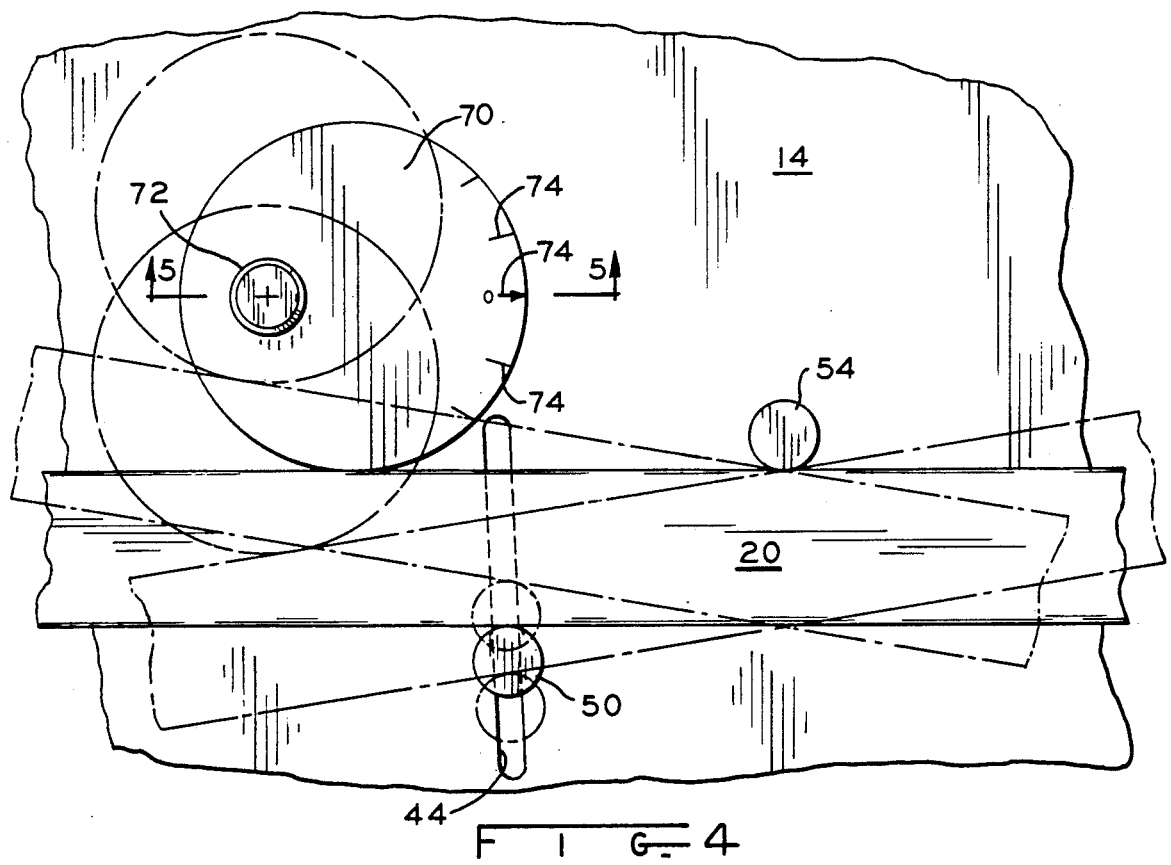
FIG. 4 is an enlarged, partial, plan view of an alternative workpiece retaining arrangement for the apparatus of FIG. 1.
Figure 5:
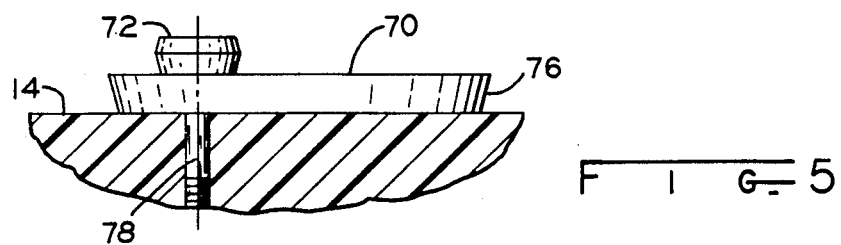
FIG. 5 is a cross sectional view taken along line 5—5 of FIG. 4.

By reference to FIGS. 4 and 5, it can be seen that a cam stop 70 may be provided instead of a removable stop 48. The cam stop includes a pivot member 72 and is secured to base 12 by means of a fastener 78. The cam is rotatable. Graduations 74 are shown on the top surface of cam 70 so that the cam may be oriented to permit cutting of a workpiece at selected angles other than the fixed angles provided by removable stops 48 as described hereinabove. Cam 70 also includes a frustoconical side surface 76 to retain a workpiece 20 in intimate contact with workpiece supporting surface 14. The workpiece 20 is again retained in contact with fixed stop 54 and camming stop 70 by means of an adjustable stop 50 as best seen in FIG. 4.

In operation, the base is secured to a flat surface such as a work bench by means of fastener 42. Base 12 is secured in position by means of bracket 60 and fastener 62. The power saw blade 30 is set at a selected cutting angle, for example 45° for a baseboard or 90° for door molding. The depth of cut of the power saw is also set such that, with the saw firmly located on saw guide 22, the blade is suitably clear of surface 18 of the base. For long workpieces, a support trestle would be required for supporting the extension of workpiece 20. The location of a removable stop 48 is selected to provide the proper miter for a workpiece 20. Furthermore, an adjustable stop 50 is moved in a slot 44 to such a position that a workpiece can be slid into the fixture. Alternatively, if a cam stop 70 were used, the cam stop is first adjusted to give the proper angle of orientation of a workpiece 20. The workpiece 20 is slid into space 32 of the fixture so that it will have one side thereof at rest against fixed stop 54 and a stop 48. The adjustable stop 50 is now moved into contact with the other side of workpiece 20 such that it is still possible to slide the work piece through the fixture. However, the workpiece is held down into intimate contact with workpiece supporting surface 14 by means of the tapered stops. The axial position of the workpiece 20 is set by reference to the guideline 34 on surface 18, indicating the position of the saw cut. It is unlikely that the workpiece will move axially upon contact with the saw blade 30 and, once cutting commences, the workpiece is held by the blade. However, as a safeguard against axial movement of workpiece 20, it would also be possible to serrate the conical surface of stop 54. When the workpiece is suitably positioned, the saw is placed on the saw guide surface, clear of the workpiece, and is held firmly against both the supporting surface 24 and the lateral guiding surface 26. After the saw is energized, it is moved across the saw guide 22 to make the required cut.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A miter apparatus for use with a portable electric saw comprising:
    a base including a saw support surface and adapted for supporting a saw, and a work support surface parallel to said saw support surface and adapted for supporting a workpiece;
    saw guide means secured to said work support surface for laterally guiding a saw;
    workpiece retaining means for retaining a workpiece in a selected orientation on said work support surface, said workpiece retaining means including a first peg guide member secured to said work support surface, a plurality of second peg guide members secured to said work support surface, a plurality of longitudinally extending slots in said work support surface and a plurality of adjustable peg guide members slidably disposed in said plurality of longitudinally extending slots, whereby a workpiece may be retained against said first peg guide member and against a selected one of said plurality of second peg guide members and a selected one of said plurality of adjustable peg guide members.

2. The apparatus according to claim 1 wherein said plurality of second guide members are removably secured to said base.

3. The apparatus according to claim 1 wherein said first, said plurality of second and said plurality of adjustable guide members all comprise generally cylindrical stops.

4. The apparatus according to claim 1 wherein said first, said plurality of second and said plurality of adjustable guide members each include at least a partially frusto-conical surface, each of said guide members defining an upper surface and a lower surface, said lower surface being smaller than said upper surface, whereby said workpiece is retained on said work support surface and prevented from upward movement thereon.

5. The apparatus according to claim 1, wherein at least one of said plurality of adjustable guide members comprises camming means rotatably mounted on said work support surface.

6. The apparatus according to claim 1 wherein each of said plurality of adjustable guide members includes securing means for securing said adjustable guide member in a selected location in one of said plurality of longitudinally extending slots wherein the workpiece may be retained against said first guide member and a selected one of said plurality of second guide members.

7. The apparatus according to claim 1 wherein at least one of said plurality of second guide members comprises camming means rotatably mounted on said work support surface.

8. The apparatus according to claim 1 including means for rotatably mounting said base on a supporting surface and means for retaining said base in a selected position relative to said supporting surface.

9. The apparatus according to claim 1 wherein said saw support surface is formed by plate-like members supported on said work support surface in spaced apart relationship, said saw guide means bridging said plate-like members to form a space between said work support surface and said saw guide for accommodating a workpiece.

10. The apparatus according to claim 1, wherein said first, plurality of second, and plurality of adjustable guide members each have flat workpiece contacting surfaces inclined toward said workpiece at an acute angle to said work support surface.

11. A miter apparatus for use with a portable electric saw, comprising:
    a generally planar base having a saw support surface bridging two spaced apart support members and a work surface which are oriented generally parallel to each other, said saw support surface adapted to support a saw, said work support surface adapted to support a workpiece;
    saw guide means supported by said work support surface and bridging said space whereby said workpiece maybe inserted into said space;
    workpiece retaining means for retaining a workpiece in a selected orientation on said work support surface for cutting by a saw, said workpiece retaining means including a first peg retaining member secured to said work support surface, a plurality of second peg retaining members secured to said work support surface, a plurality of longitudinally extending slots in said work support surface and a plurality of adjustable peg retaining members slidably disposed in said plurality of longitudinally extending slots, whereby a workpiece may be retained for cutting by a saw against said first peg retaining member and against a selected one of said plurality of second peg retaining members and a selected one of said plurality of adjustable peg retaining members.

12. The apparatus according to claim 11 wherein said first, plurality of second and plurality of adjustable workpiece retaining members each include at least a generally frusto-conical surface, each of said retaining members defining an upper surface and a lower surface, said lower surface being smaller than said upper surface, whereby said workpiece is retained on said work support surface and prevented from upward movement thereon.

13. The apparatus according to claim 11 wherein each of said plurality of adjustable retaining members includes means for securing said adjustable retaining member in a selected location in one of said plurality of longitudinally extending slots, wherein the workpiece is retained against said first retaining member and a selected one of said plurality of second workpiece retaining members.

14. The apparatus according to claim 11 wherein at least one of said plurality of second workpiece retaining members comprises camming means rotatably mounted on said work support surface.

15. The apparatus according to claim 11 including means for rotatably mounting said base on a supporting surface and means for retaining said base in a selected position relative to said supporting surface.

16. The apparatus according to claim 11, wherein at least one of said plurality of adjustable retaining members comprises camming means rotatably mounted on said work support surface.

17. A miter apparatus for use with a portable electric saw, comprising:
a generally planar base including a first surface, a saw support surface parallel to and adjacent said first surface and adapted for supporting a saw, and a work support surface parallel to and positioned intermediate said first and saw support surfaces and adapted for supporting a workpiece, said saw support surface formed by two surface areas with a space located therebetween;
saw guide means supported by said saw support surface and bridging said space whereby a said workpiece may be inserted into said space;
a first peg workpiece retaining stop member secured on said work support surface;
a plurality of apertures in said work support surface;
a second peg workpiece retaining stop member removably retained in a selected one of said plurality of apertures;
a plurality of longitudinally extending slots in said work support surface; and
a plurality of adjustable peg workpiece retaining stop members disposed in said plurality of longitudinal extending slots, whereby a workpiece may be retained on said work support surface in a selected orientation for cutting by a saw.

18. The apparatus according to claim 17 wherein said first, plurality of second and plurality of adjustable workpiece retaining stop members each include at least a partially frusto-conical surface, each of said retaining stop members defining an upper surface and a lower surface, said lower surface being smaller than said upper surface, whereby said workpiece is retained on said work support surface and prevented from upward movement thereon.

19. The apparatus according to claim 17 wherein each of said plurality of adjustable workpiece retaining stop members includes means for securing said adjustable work piece retaining stop member in a selected location in one of said plurality of longitudinally extending slots wherein the workpiece is in contact with said first guide member and a selected one of said plurality of second workpiece retaining stop members.

20. The apparatus according to claim 17 wherein said plurality of adjustable workpiece retaining stop members each comprise camming means rotatably mounted on said work supporting surface for retaining said workpiece in contact with said first and said plurality of second workpiece retaining stop members.

* * * * *